United States Patent
Itkin (10) Patent No.: US 11,353,547 B2
(45) Date of Patent: Jun. 7, 2022

(54) RADAR SYSTEMS

(71) Applicant: Infineon Technologies AG, Neubiberg (DE)

(72) Inventor: Grigory Itkin, Munich (DE)

(73) Assignee: Infineon Technologies AG, Neubiberg (DE)

( * ) Notice: Subject to any disclaimer, the term of this patent is extended or adjusted under 35 U.S.C. 154(b) by 226 days.

(21) Appl. No.: 16/863,326

(22) Filed: Apr. 30, 2020

(65) Prior Publication Data

US 2021/0341569 A1  Nov. 4, 2021

(30) Foreign Application Priority Data

May 15, 2019 (DE) .......................... 102019112748.3

(51) Int. Cl.
*G01S 7/292* (2006.01)
(52) U.S. Cl.
CPC .................................. *G01S 7/2925* (2013.01)
(58) Field of Classification Search
CPC ...... G01S 13/87; G01S 7/2925; G01S 7/4004; G01S 7/03; G01S 7/40; G01S 7/28; H03L 7/099; H03L 7/24; H03L 7/087; H03L 7/0995; H03L 7/097; H03L 7/07
See application file for complete search history.

(56) References Cited

U.S. PATENT DOCUMENTS 6,362,777 B1 * 3/2002 Kawakami ................ G01S 7/28
342/104
2014/0333470 A1 * 11/2014 Blodt .................... G01F 23/802
342/124

FOREIGN PATENT DOCUMENTS

DE        102017201141 A1    7/2018

* cited by examiner

*Primary Examiner* — Timothy A Brainard
(74) *Attorney, Agent, or Firm* — Harrity & Harrity, LLP (57) ABSTRACT

A radar system is provided. The radar system includes a first radar chip, a second radar chip and a third radar chip. Further, the second radar chip includes a first coupling circuit. Additionally, the third radar chip includes a second coupling circuit. A control circuit is configured to control the first coupling circuit and the second coupling circuit. The first radar chip includes an analysis circuit configured to determine information indicating a reflected wave component. The analysis circuit is further configured to determine, based on the determined information, whether distributions of the oscillation signal to the first and second input nodes via the first and second signal lines are equal.

20 Claims, 5 Drawing Sheets

RADAR SYSTEMS

CROSS REFERENCE TO RELATED APPLICATION

This application claims priority to German Patent Application No. 102019112748.3 filed on May 15, 2019, the content of which is incorporated by reference herein in its entirety.

FIELD

The present disclosure relates to radar. For example, implementations described herein relate to radar systems and a corresponding method.

BACKGROUND

Radar systems comprising several Monolithic Microwave Integrated Circuits (MMICs) need to symmetrically distribute the Local Oscillator (LO) signal of the master MIMIC to each single slave MMIC. The LO signal distribution via a Printed Circuit Board (PCB) may exhibit a mismatch due to various factors such as PCB production variations, temperature, aging etc. A mismatch in length between the LO distribution lines to the slave MMICs causes phase differences of the LO signals upon arrival at the slave MMICs. For example, already a length mismatch of 0.1 mm may cause a phase difference of up to several tens of degree.

SUMMARY

The implementations described herein may determine if the signal distribution within a radar system is symmetrical.

An example relates to a radar system. The radar system comprises a first radar chip, a second radar chip and a third radar chip. The first radar chip comprises an output node configured to output an oscillation signal. The second radar chip comprises a first input node coupled to the output node of the first radar chip via a first signal line. Further, the second radar chip comprises a first coupling circuit capable of controllably coupling a selected one of a plurality of first loads to the first input node. The third radar chip comprises a second input node coupled to the output node of the first radar chip via a second signal line. Additionally, the third radar chip comprises a second coupling circuit capable of controllably coupling a selected one of a plurality of second loads to the second input node. A control circuit is configured to control the first coupling circuit and the second coupling circuit to sequentially couple at least two different combinations of the first and second loads to the first and second input nodes. The first radar chip comprises an analysis circuit configured to determine information indicating a reflected wave component and a forward wave component at the output node of the first radar chip for each of the at least two different combinations of the first and second loads. The analysis circuit is further configured to determine, based on the determined information, whether the distributions of the oscillation signal to the first and second input nodes via the first and second signal lines are equal.

A further examples relates to another radar system. The radar system comprises a first radar chip and a second radar chip. The first radar chip comprises an output node configured to output an oscillation signal. Further, the first radar chip comprises a first input node coupled to the output node via a first signal line. Additionally, the first radar chip comprises a first coupling circuit capable of controllably coupling a selected one of a plurality of first loads to the first input node. The second radar chip comprises a second input node coupled to the output node of the first radar chip via a second signal line. Further, the second radar chip comprises a second coupling circuit capable of controllably coupling a selected one of a plurality of second loads to the second input node. A control circuit is configured to control the first coupling circuit and the second coupling circuit to sequentially couple at least two different combinations of the first and second loads to the first and second input nodes. The first radar chip comprises an analysis circuit configured to determine information indicating a reflected wave component and a forward wave component at the output node of the first radar chip for each of the at least two different combinations of the first and second loads. The analysis circuit is further configured to determine, based on the determined information, whether the distributions of the oscillation signal to the first and second input nodes via the first and second signal lines are equal.

Another examples relate to a method. The method comprises outputting an oscillation signal at an output node. Additionally, the method comprises coupling at least two different combinations of first and second loads to first and second input nodes. The method further comprises determining information indicating a reflected wave component and a forward wave component at the output node for each of the at least two different combinations of the first and second loads. In addition, the method comprises determining, based on the determined information, whether the distributions of the oscillation signal to the first and second input nodes via first and second signal lines are equal.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, e.g. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
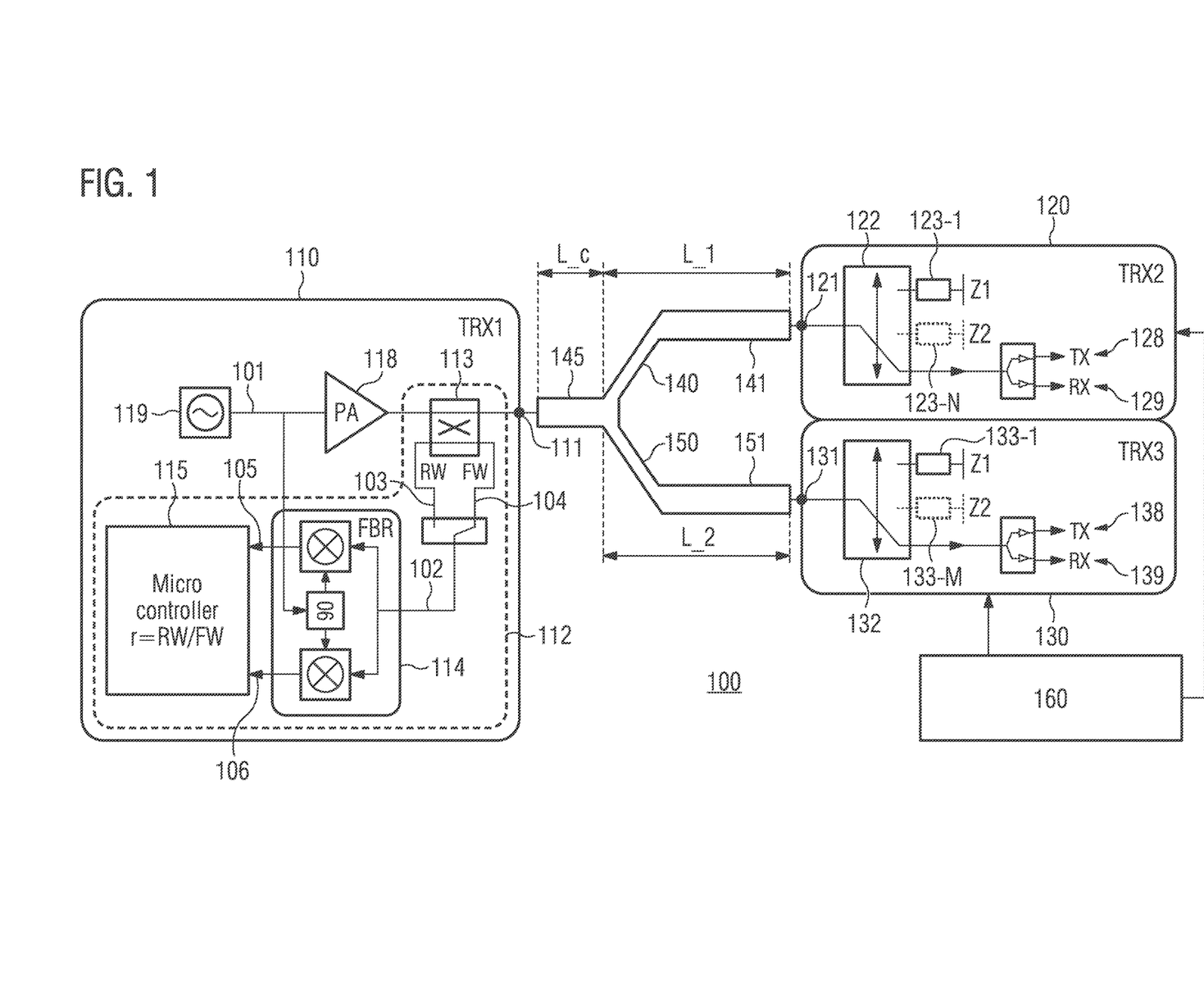
FIG. 1 illustrates a first example of a radar system.

FIG. 1 illustrates a radar system 100. The radar system 100 comprises a first radar chip 110, a second radar chip 120 and a third radar chip 130. The first to third radar chips 110, 120 and 130 are semiconductor chips comprising radar components and/or circuitry. For example, the first to third radar chips 110, 120 and 130 may be MMICs.

The first radar chip 110 is operated as a master, whereas the second radar chip 120 and the third radar chip 130 are operated as slaves in the example of FIG. 1.

The first radar chip 110 as master comprises an oscillator circuit 119 such as a LO configured to generate an oscillation signal 101 (e.g. an LO signal). The oscillation signal 101 may be an unmodulated signal (e.g. representing a sine wave of predefined frequency) or a modulated signal (e.g. frequency modulated, amplitude modulated, phase modulated or a combination thereof). The first radar chip 110 further comprises an output node 111 configured to output the oscillation signal 101.

The second radar chip 120 comprises a first input node 121 that is coupled to the output node 111 of the first radar chip 110 via a first signal line 140 (e.g. a Radio Frequency, RF, micro strip line). Similarly, the third radar chip 130 comprises a second input node 131 that is coupled to the output node 111 of the first radar chip 110 via a second signal line 150. The oscillation signal 101 is distributed from the first radar chip 110 to the second radar chip 120 and the third radar chip 130 via the first signal line 140 and the second signal line 150.

In the example of FIG. 1, the first signal line 140 and the second signal line 150 share a common signal line section 145. In other words, the first signal line 140 and the second signal line 150 have the common signal line section 145 in common (e.g. the first signal line 140 and the second signal line 150 overlap in part/are partially identical). In alternative examples, the first signal line 140 and the second signal line 150 may be completely separated (e.g. the first signal line 140 and the second signal line 150 may exhibit no common signal line section).

For illustrative purposes, a respective transmit path 128, 138 for transmitting a radar transmit signal and a respective receive path 129, 139 for receiving a radar receive signal is illustrated in FIG. 1 for the second radar chip 120 and the third radar chip 130. For transmitting the respective radar transmit signal and/or receiving the respective radar receive signal, the second radar chip 120 and the third radar chip 130 use the oscillation signal 101 as provided by the first radar chip 110. Although not explicitly illustrated in FIG. 1, the first radar chip 110 may also comprise a transmit path for transmitting a radar transmit signal and a receive path for receiving a radar receive signal. It is to be noted that each of the radar chips 110, 120 and 130 may comprise one or more additional transmit and/or receive paths.

For proper operation of the radar system 100 (e.g. radar Multiple Input Multiple Output, MIMO, operation), the distribution of the oscillation signal 101 to the input nodes 121 and 131 should be symmetrical. The absolute phase between the first radar chip 110 and the second and third radar chips 120 and 130 is not important, but the phase shifts between the first and the second radar chips 110 and 120, and the first and third radar chips 110 and 130 should be equal. In other words, it is important to know whether the distributions of the oscillation signal 101 to the first and second input nodes 121 and 131 via the first and second signal lines 140 and 150 are equal. As described above, a length mismatch between the first and second signal lines 140 and 150 may result in a phase shift of the oscillation signal 101 at the respective input node 121 or 131. The common signal line section 145 of length L_c is not critical. In the example of FIG. 1, it is of interest whether the signal line sections 141 and 151 of length L_1 or L_2 of the first and second signal lines 140 and 150 are equal. In other words, it is of interest whether the transmission lengths over the first and second signal lines 140 and 150 are equal (the same). Although the routing of the oscillation signal distribution to the input nodes 121 and 131 may be designed symmetrically, effects like production tolerances, temperature, aging or edging may cause a mismatch in the length of the first and second signal lines 140 and 150.

In order to determine not equal distributions of the oscillation signal 101 to the first and second input nodes 121 and 131 via the first and second signal lines 140 and 150, the radar system 100 makes use of the fact that each of the first and second signal lines 140 and 150 is an impedance transformer.

Therefore, the second radar chip 120 comprises a first coupling circuit 122 capable of controllably coupling a selected one of a plurality of first loads 123-1, ..., 123-N to the first input node 121. Similarly, the third radar chip 130 comprises a second coupling circuit 132 capable of controllably coupling a selected one of a plurality of second loads 133-1, ..., 133-M to the second input node 131. The plurality of first loads 123-1, ..., 123-N comprises N≥2 first loads 123-1, ..., 123-N, wherein the N first loads 123-1, ..., 123-N exhibit different impedances. Similarly, the plurality of second loads 133-1, ..., 133-M comprises M≥2 second loads 133-1, ..., 133-M, wherein the M second loads 133-1, ..., 133-M exhibit different impedances. For example, each of the plurality of first loads 123-1, ..., 123-N and the plurality of second loads 133-1, ..., 133-M may exhibit an impedance different from a predefined value. The predefined value may, e.g., be equal to the (designed) line impedance of the first and second signal lines 140 and 150. For example, the predefined value may be 50 Ω, 100Ω or 200Ω. The number of second loads may be identical to or be different from the number of first loads. In summary, each of the input nodes 121 and 131 is coupled with a switch and several well-defined loads.

Further, the first coupling circuit 122 and the second coupling circuit 132 are capable of controllably coupling at least one of the transmit path 128 or 138, and the receive path 129 or 139 of the respective radar chip 120 and 130 to the respective input node 121 or 131 for regular radar signal generation and/or reception.

The radar system 100 further comprises a control circuit (e.g. a MicroController Unit, MCU) configured to control the first coupling circuit 122 and the second coupling circuit 132 to sequentially couple at least two different combinations of the first and second loads 123-1, ..., 123-N and 133-1, ..., 133-M to the first and second input nodes 121 and 131. In this respect, the different combinations of the first and second loads 123-1, ..., 123-N and 133-1, ..., 133-M may be coupled to the first and second input nodes 121 and 131 in immediate succession or not. For example, if each of the first and second loads 123-1, ..., 123-N and 133-1, ..., 133-M comprises a respective load Z1 and respective load Z2, two or more of the following combinations may be sequentially coupled to the first and second input nodes 121 and 131: Z1∥Z1 (e.g. load Z1 of the first loads to the first input node 121 and load Z1 of the second loads to the second input node 131), Z1∥Z2, Z2∥Z1 and Z2∥Z2.

The first radar chip 110 additionally comprises an analysis circuit 112. The analysis circuit 112 is configured to determine information 102 indicating a reflected wave component and a forward wave component at the output node 111 of the first radar chip 110 for each of the at least two different combinations of the first and second loads 123-1, ..., 123-N and 133-1, ..., 133-M. The analysis circuit 112 is further configured to determine, based on the determined information 102, whether the distributions of the oscillation signal 101 to the first and second input nodes 121 and 131 via the first and second signal lines 140 and 150 are equal.

In other words, the reflected wave component and the forward wave component at the output node 111 of the first radar chip 110 are measured for different load conditions at the input ports 121 and 131 of the radar chips 120 and 130 (e.g. the termination ports of the signal lines 140 and 150). The reflected wave component and the forward wave component at the output node 111 of the first radar chip 110 depend on the used loads as well as the lengths of the signal lines 140 and 150. In the example of FIG. 1, the reflected wave component and the forward wave component at the output node 111 of the first radar chip 110 depend in particular on the lengths $L\_1$ and $L\_2$ of the first and second signal lines 140 and 150.

Therefore, if the lengths $L\_1$ and $L\_2$ of the first and second signal lines 140 and 150 are not equal, the pieces of determined information about the reflected wave component and the forward wave component at the output node 111 of the first radar chip 110 are not equal for different load combinations. On the other hand, if the lengths $L\_1$ and $L\_2$ of the first and second signal lines 140 and 150 are equal, the pieces of determined information about the reflected wave component and the forward wave component at the output node 111 of the first radar chip 110 are substantially equal for different load combinations. Accordingly, the analysis circuit 112 is able to determine whether the oscillation signal distribution to the first and second input nodes 121 and 131 is symmetric based on the information 102 indicating the reflected wave component and the forward wave component at the output node 111 of the first radar chip 110 for the different combinations of the first and second loads 123-1, ..., 123-N and 133-1, ..., 133-M.

In the example of FIG. 1, the analysis circuit 112 comprises a directional coupler 113 coupled to the output node 111 of the first radar chip 110. The directional coupler 113 is configured to output a first signal 103 indicative of the reflected wave component and a second signal 104 indicative of the forward wave component. Accordingly, the determined information 102 is indicative of a respective phase and a respective amplitude of the reflected wave component and the forward wave component at the output node 111 of the first radar chip 110. Further, the oscillator circuit 119 is coupled to the output node 111 of the first radar chip 110 via the directional coupler 113 and a Power Amplifier (PA) 118.

The analysis circuit 112 is configured to determine an impedance F at the output node 111 of the first radar chip 110 based on the determined information 102. Therefore, the analysis circuit 112 further comprises a feedback receiver 114 configured to down-convert the first signal 103 and the second signal 104 based on the oscillation signal 101 in order to obtain a first down-converted signal and a second down-converted signal. For example, as illustrated in FIG. 1, the feedback receiver 114 may down-convert the first signal 103 and the second signal 104 such that the first down-converted signal and the second down-converted signal each comprise an in-phase component 105 and a quadrature component 106.

A processing circuit 115 of the analysis circuit 112 is configured to determine the impedance F at the output node 111 of the first radar chip 110 based on the first down-converted signal representing the reflected wave component and the second down-converted signal representing the forward wave component.

The analysis circuit 112 (e.g. using the processing circuit 115) is further configured to compare a threshold value to a difference between the impedance F at the output node 111 of the first radar chip 110 for a first one of the at least two different combinations of the first and second loads 123-1, ..., 123-N and 133-1, ..., 133-M and the impedance F at the output node 111 of the first radar chip 110 for a second one of the at least two different combinations of the first and second loads 123-1, ..., 123-N and 133-1, ..., 133-M. In other words, the analysis circuit compares the difference in impedance at the output node 111 of the first radar chip 110 for the different load combinations to the threshold value. Comparing the difference in impedance at the output node 111 of the first radar chip 110 for the different load combinations to the threshold value may allow to determine whether the distributions of the oscillation signal to the first and second input nodes via the first and second signal lines are equal.

Figure 2:
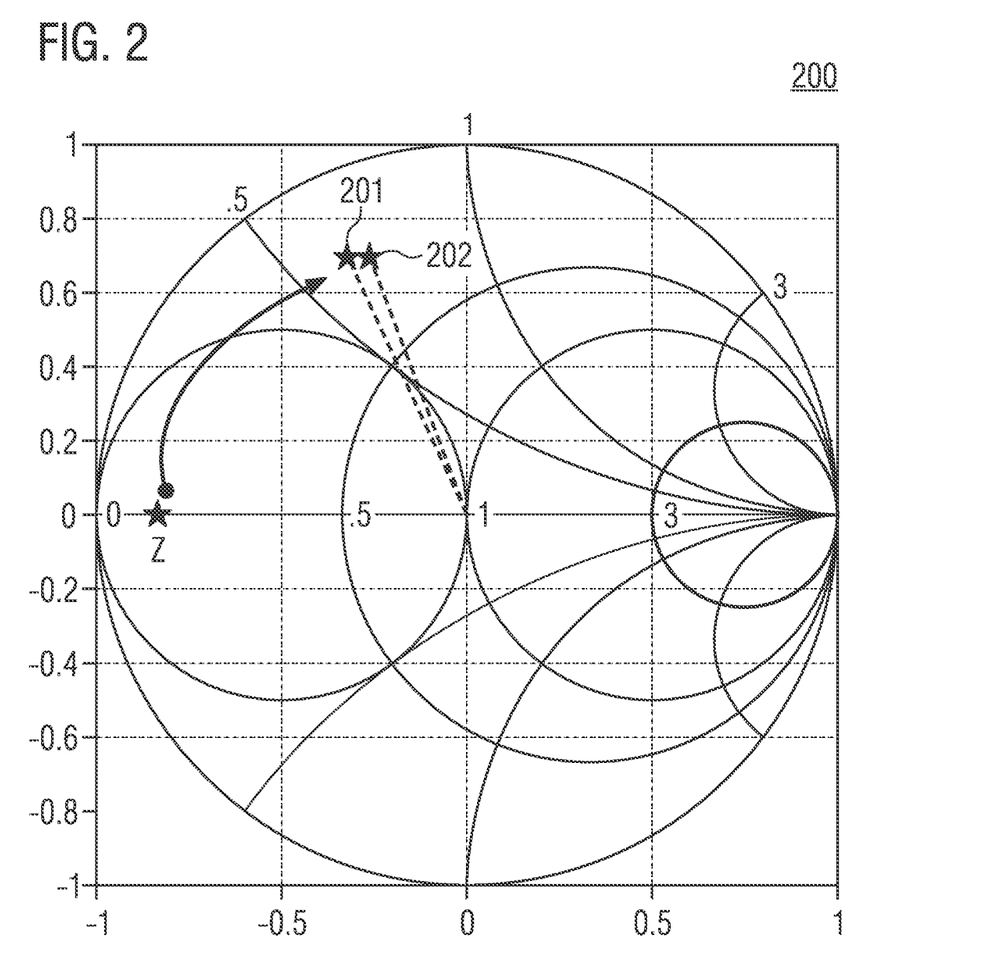
FIG. 2 illustrates an example of a Smith chart for equal signal lines.
Figure 3:
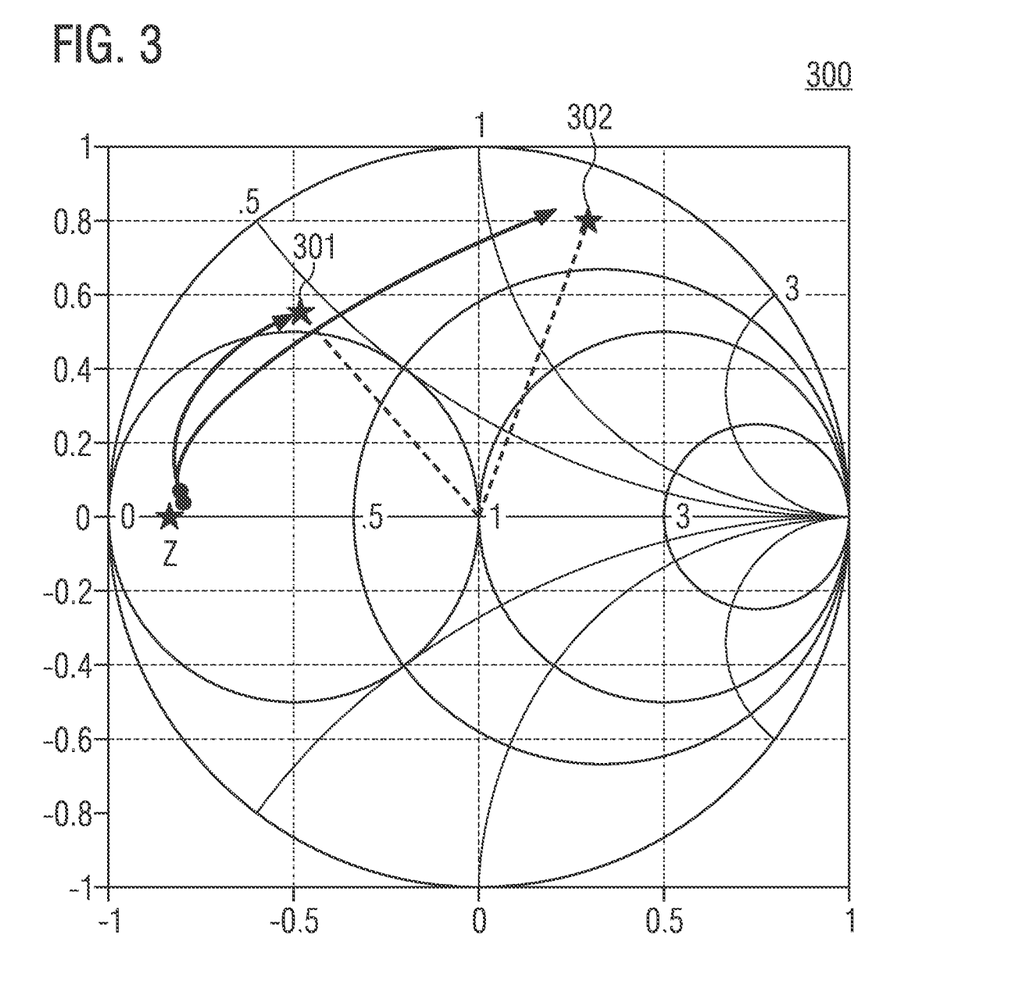
FIG. 3 illustrates an example of a Smith chart for unequal signal lines.

As described above, the first and second signal lines 140 and 150 act as impedance transformers. Therefore, the impedance F measured at the output node 111 of the first radar chip 110 depends on the loads coupled to the input nodes 121 and 131 as well as the lengths of the first signal line (e.g. $L\_c+L\_1$) or the second signal line (e.g. $L\_c+L\_2$). The transformation coefficient is a known function that depends on the lengths of the first and second signal lines 140 and 150. The impact of the lengths of the first and second signal lines 140 and 150 on the impedance transformation is illustrated in FIGS. 2 and 3. FIG. 2 and illustrate two Smith charts. FIG. 2 illustrates the Smith chart 200 for equal first and second signal lines 140 and 150. FIG. 3 illustrates the Smith chart 300 for not equal first and second signal lines 140 and 150.

In FIGS. 2 and 3, the impedance at the output node 111 of the first radar chip 110 is measured to two times for two different load combinations (loads coupled to the input nodes 121 and 131 are interchanged/swapped for the two measurements). Since the first and second signal lines 140 and 150 are equal in the example of FIG. 2, the two measured impedances 201 and 202 are close to each other. Here, the first and second signal lines 140 and 150 perform substantially the same impedance transformation so that the measured impedances are the same or very close to each other. On the other hand, the two measured impedances 301 and 302 in FIG. 3 are substantially different from each other since the first and second signal lines 140 and 150 are not equal in the example of FIG. 3. Here, the first and second signal lines 140 and 150 exhibit different transformation coefficients so that the measured impedances are quite different.

Accordingly, by comparing the difference between the impedances at the output node 111 of the first radar chip 110 for different load combinations to a threshold, the analysis circuit 112 may determine whether the distributions of the oscillation signal 101 to the first and second input nodes 121 and 131 via the first and second signal lines 140 and 150 are equal. For example, if the difference is greater than the threshold value, the analysis circuit 112 may be configured to determine that the distributions of the oscillation signal 101 to the first and second input nodes 121 and 131 via the first and second signal lines 140 and 150 are not equal, and vice versa.

Using two or more different load combinations for the impedance measurement may allow to determine the distribution length mismatch even if the input node impedances are not stable.

The proposed measurement technique may allow to detect impedance differences if the first and second signal lines 140 and 150 have a difference in length of, e.g., 100 µm. In case a distribution length mismatch is determined, the length difference between the first and second signal lines 140 and 150 may be determined and any action to compensate it (e.g. in hardware and/or in software) may be taken. For example, a phase shift of the oscillation signal due to the length difference may be determined and a phase shifter of one of the radar chips 120 and 130 may be controlled accordingly to delay the oscillation signal received at the respective input node 121 or 131.

No additional input or output nodes are required—no matter how many slave radar chips are coupled to master radar chip 110. Although not illustrated in FIG. 1, the radar system 100 may comprise one or more additional slave radar chips. In other words, the radar system 100 may comprise three or more satellite MMICs. For example, the radar system may further comprise a fourth radar chip comprising a third input node coupled to the output node of the first radar chip via a third signal line. The fourth radar chip comprises a third coupling circuit capable of controllably coupling a selected one of a plurality of third loads to the third input node. The control circuit 160 is then accordingly configured to control the first to third coupling circuits to sequentially couple at least three different combinations of the first to third loads to the first to third input nodes. The analysis circuit 112 is further configured to determine information indicating the reflected wave component and the forward wave component for each of the at least three different combinations of the first to third loads. The analysis circuit 112 is further configured to determine, based on the determined information, whether the distributions of the oscillation signal to the second to fourth radar chips via the first to third signal lines are equal. That is, the measurement matrix may become more complex for additional radar chips. However, the underlying principle remains the same.

Figure 4:
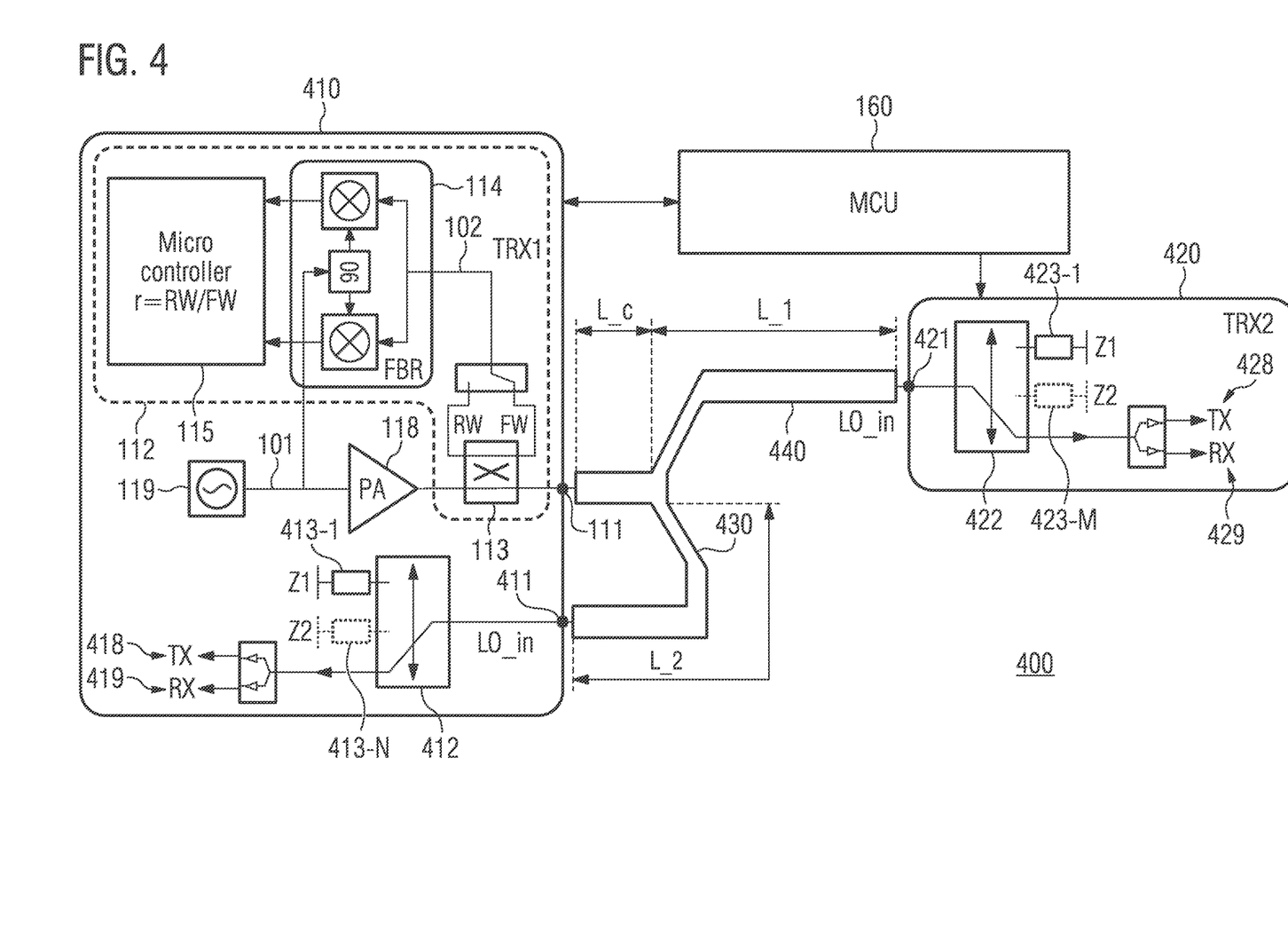
FIG. 4 illustrates a second example of a radar system.

Another radar system 400 is illustrated in FIG. 4. The radar system 400 is similar to the radar system 100 described above in connection with FIG. 1. The main difference between the radar system 400 and the radar system 100 is that the first radar chip 110 comprises a self-feeding mechanism. That is, the oscillation signal 101 is fed back to the first radar chip 110 via a first signal line 430.

In addition to the first radar chip 110, the first radar chip 410 additionally comprises a first input node 411 coupled to the output node 111 via the first signal line 430. Further, the first radar chip 410 additionally comprises a first coupling circuit 412 capable of controllably coupling a selected one of a plurality of first loads 413-1, . . . , 413-N to the first input node 411. The first radar chip 410 further additionally comprises at least one transmit path 418 and at least one receive path 419. The first coupling circuit 412 is further capable of controllably coupling at least one of the transmit path 418 and the receive path 419 to the first input node 411.

The second radar chip 420 comprises a second input node 421 coupled to the output node 111 of the first radar chip 420 via a second signal line 440. Further, the second radar chip 420 comprises a second coupling circuit 422 capable of controllably coupling a selected one of a plurality of second loads 423-1, . . . , 423-M to the second input node 411. Additionally, the second radar chip 420 comprises at least one transmit path 428 and at least one receive path 429. The second coupling circuit 422 is further capable of controllably coupling at least one of the transmit path 428 and the receive path 429 to the second input node 421. In other words, the second radar chip 420 is identical to the second radar chip 120 described above.

The first and second loads 413-1, . . . , 413-N and 423-1, . . . , 423-M are implemented in the same manner as the first and second loads 123-1, . . . , 123-N and 133-1, . . . , 133-M described above (e.g. each of the plurality of first loads 413-1, . . . , 413-N and the plurality of second loads 423-1, . . . , 423-M may exhibit a resistance different from a predefined value such as 50Ω). It is therefore referred to the above description of the first and second loads 123-1, . . . , 123-N and 133-1, . . . , 133-M.

The first and second signal lines 430 and 440 are implemented in the same manner as the signal lines 140 and 150 described above. It is therefore referred to the above description of the signal lines 140 and 150.

For checking whether the distributions of the oscillation signal 101 to the second radar 420 and back to the first radar chip 410 via the first and second signal lines 430 and 440 are equal, the same technique as described above is used.

That is, the control circuit 160 controls the first coupling circuit 412 and the second coupling circuit 422 to sequentially couple at least two different combinations of the first and second loads 413-1, . . . , 413-N and 423-1, . . . , 423-M to the first and second input nodes 411 and 421.

The analysis circuit 112 of the first radar chip 410 determines the information 102 indicating the reflected wave component and the forward wave component at the output node 111 of the first radar chip 420 for each of the at least two different combinations of the first and second loads 413-1, . . . , 413-N and 423-1, . . . , 423-M as described above. Further, the analysis circuit 112 determines, based on the determined information 102, whether the distributions of the oscillation signal 101 to the first and second input nodes 411 and 421 via the first and second signal lines 430 and 440 are equal.

As described above, the analysis circuit 112 may determine the impedance F at the output node 111 of the first radar chip 120 based on the determined information 102. By comparing a threshold value to the difference between the impedance F at the output node 111 of the first radar chip 420 for a first one of the at least two different combinations of the first and second loads 413-1, . . . , 413-N and 423-1, . . . , 423-M and the impedance F at the output node 111 of the first radar chip 420 for a second one of the at least two different combinations of the first and second loads 413-1, . . . , 413-N and 423-1, . . . , 423-M, the analysis circuit 112 may determine whether the distributions of the oscillation signal 101 to the first and second input nodes 411 and 421 via the first and second signal lines 430 and 440 are equal. For example, if the difference is greater than the threshold value, the analysis circuit 112 may determine that the distributions of the oscillation signal 101 to the first and second input nodes 411 and 421 via the first and second signal lines are not equal—analogous to what is described above. For the details, it is therefore referred to the above description.

Similar to radar system 100, also the radar system 400 may comprise one or more additional slave radar chips. In other words, the radar system 400 may comprise two or more satellite MMICs. The measurement matrix for determining equal oscillation signal distribution may become more complex for additional radar chips. However, the underlying principle remains the same.

Figure 5:
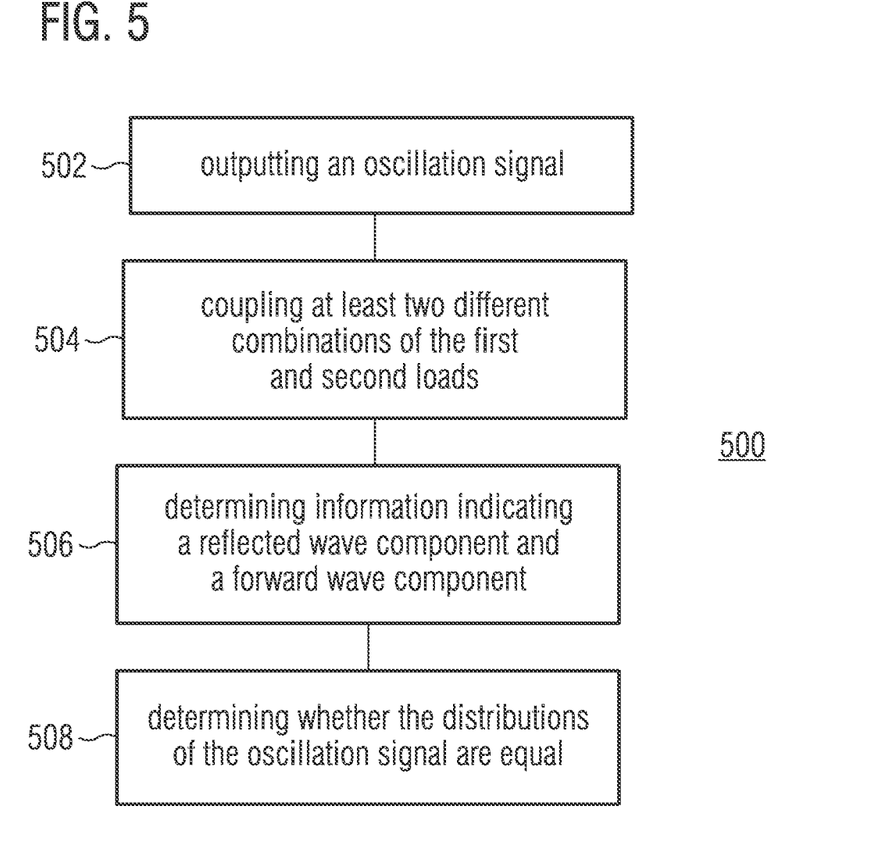
FIG. 5 illustrates a flowchart of an example of a method.

For further illustrating the operation of the radar systems described above, FIG. 5 illustrates a flowchart of an example method 500. Method 500 comprises outputting 502 an oscillation signal at an output node. Additionally, method 500 comprises coupling 504 at least two different combinations of first and second loads to first and second input nodes. Method 500 further comprises determining 506 information indicating a reflected wave component and a forward wave component at the output node for each of the at least two different combinations of the first and second loads. In addition, method 500 comprises determining 508, based on the determined information, whether the distributions of the oscillation signal to the first and second input nodes via first and second signal lines are equal.

More details and aspects of the method are explained in connection with the proposed technique or one or more example implementations described above (e.g. FIGS. 1 and 4). The method may comprise one or more additional optional features corresponding to one or more aspects of the proposed technique or one or more examples described above. For example, a first radar chip may comprise the output node, a second radar chip may comprise the first input node and a third radar chip may comprise the second input node. Alternatively, a first radar chip may comprise the output node and the first input node, and a second radar chip may comprise the second input node.

The examples as described herein may be summarized as follows:

Some examples relate to a radar system. The radar system comprises a first radar chip, a second radar chip and a third radar chip. The first radar chip comprises an output node configured to output an oscillation signal. The second radar chip comprises a first input node coupled to the output node of the first radar chip via a first signal line. Further, the second radar chip comprises a first coupling circuit capable of controllably coupling a selected one of a plurality of first loads to the first input node. The third radar chip comprises a second input node coupled to the output node of the first radar chip via a second signal line. Additionally, the third radar chip comprises a second coupling circuit capable of controllably coupling a selected one of a plurality of second loads to the second input node. A control circuit is configured to control the first coupling circuit and the second coupling circuit to sequentially couple at least two different combinations of the first and second loads to the first and second input nodes. The first radar chip comprises an analysis circuit configured to determine information indicating a reflected wave component and a forward wave component at the output node of the first radar chip for each of the at least two different combinations of the first and second loads. The analysis circuit is further configured to determine, based on the determined information, whether the distributions of the oscillation signal to the first and second input nodes via the first and second signal lines are equal.

In some examples, the determined information is indicative of a respective phase and a respective amplitude of the reflected wave component and the forward wave component.

According to some examples, the analysis circuit is further configured to determine an impedance at the output node of the first radar chip based on the determined information.

The analysis circuit is in some examples further configured to compare a difference between the impedance at the output node of the first radar chip for a first one of the at least two different combinations of the first and second loads and the impedance at the output node of the first radar chip for a second one of the at least two different combinations of the first and second loads to a threshold value.

According to some examples, the analysis circuit is further configured to determine the distribution of the oscillation signal to the first and second input nodes via the first and second signal lines being not equal if the difference is greater than the threshold value.

In some examples, the oscillation signal is modulated.

According to some examples, the first signal line and the second signal line share a common signal line section. In alternative examples, the first signal line and the second signal line are completely separated.

In some examples, each of the plurality of first loads and the plurality of second loads exhibit an impedance different from a predefined value. The predefined value is 50Ω according to some examples.

The analysis circuit comprises in some examples a directional coupler coupled to the output node of the first radar chip and configured to output a first signal indicative of the reflected wave component, and a second signal indicative of the forward wave component.

According to some examples, the analysis circuit further comprises a feedback receiver configured to down-convert the first signal and the second signal based on the oscillation signal in order to obtain a first down-converted signal and a second down-converted signal.

In some examples, the analysis circuit further comprises a processing circuit configured to determine an impedance at the output node of the first radar chip based on the first down-converted signal and the second down-converted signal.

According to some examples, the first coupling circuit is further capable of controllably coupling at least one of a transmit path and a receive path of the second radar chip to the first input node.

In some examples, the first radar chip further comprises an oscillator circuit coupled to the output node of the first radar chip via the directional coupler and configured to generate the oscillation signal.

The radar system, according to some examples, further comprises a fourth radar chip comprising a third input node coupled to the output node of the first radar chip via a third signal line. The fourth radar chip comprises a third coupling circuit capable of controllably coupling a selected one of a plurality of third loads to the third input node. The control circuit is further configured to control the first to third coupling circuits to sequentially couple at least three different combinations of the first to third loads to the first to third input nodes. The analysis circuit is further configured to determine information indicating the reflected wave component and the forward wave component for each of the at least three different combinations of the first to third loads. The analysis circuit is further configured to determine, based on the determined, whether the distributions of the oscillation signal to the second to fourth radar chips via the first to third signal lines are equal.

Further examples relate to another radar system. The radar system comprises a first radar chip and a second radar chip. The first radar chip comprises an output node configured to output an oscillation signal. Further, the first radar chip comprises a first input node coupled to the output node via a first signal line. Additionally, the first radar chip comprises a first coupling circuit capable of controllably coupling a selected one of a plurality of first loads to the first input node. The second radar chip comprises a second input node coupled to the output node of the first radar chip via a second signal line. Further, the second radar chip comprises a second coupling circuit capable of controllably coupling a selected one of a plurality of second loads to the second input node. A control circuit is configured to control the first coupling circuit and the second coupling circuit to sequentially couple at least two different combinations of the first and second loads to the first and second input nodes. The first radar chip comprises an analysis circuit configured to determine information indicating a reflected wave component and a forward wave component at the output node of the first radar chip for each of the at least two different combinations of the first and second loads. The analysis circuit is further configured to determine, based on the determined information, whether the distributions of the oscillation signal to the first and second input nodes via the first and second signal lines are equal.

In some examples, analysis circuit is further configured to determine an impedance at the output node of the first radar chip based on the determined information.

According to some examples, the analysis circuit is further configured to compare a difference between the impedance at the output node of the first radar chip for a first one of the at least two different combinations of the first and second loads and the impedance at the output node of the first radar chip for a second one of the at least two different combinations of the first and second loads to a threshold value. Further, the analysis circuit is configured to determine the distributions of the oscillation signal to the first and second input nodes via the first and second signal lines being not equal if the difference is greater than the threshold value.

In some examples, each of the plurality of first loads and the plurality of second loads exhibits an impedance different from a predefined value.

Other examples relate to a method. The method comprises outputting 302 an oscillation signal at an output node. Additionally, the method comprises coupling at least two different combinations of first and second loads to first and second input nodes. The method further comprises determining information indicating a reflected wave component and a forward wave component at the output node for each of the at least two different combinations of the first and second loads. In addition, the method comprises determining, based on the determined information, whether the distributions of the oscillation signal to the first and second input nodes via first and second signal lines are equal.

According to some examples, a first radar chip comprises the output node, a second radar chip comprises the first input node and a third radar chip comprises the second input node. In alternative examples, a first radar chip comprises the output node and the first input node, and a second radar chip comprises the second input node.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:
1. A radar system, comprising:
a first radar chip comprising an output node configured to output an oscillation signal;
a second radar chip comprising a first input node coupled to the output node of the first radar chip via a first signal line, and a first coupling circuit capable of controllably coupling a selected one of a plurality of first loads to the first input node;

a third radar chip comprising a second input node coupled to the output node of the first radar chip via a second signal line, and a second coupling circuit capable of controllably coupling a selected one of a plurality of second loads to the second input node; and a control circuit configured to control the first coupling circuit and the second coupling circuit to sequentially couple at least two different combinations of the first and second loads to the first and second input node, wherein the first radar chip comprises an analysis circuit configured to determine information indicating a reflected wave component and a forward wave component at the output node of the first radar chip for each of the at least two different combinations of the first and second loads, and wherein the analysis circuit is further configured to determine, based on the determined information, whether distributions of the oscillation signal to the first and second input node via the first and second signal lines are equal.

2. The radar system of claim 1, wherein the determined information is indicative of a respective phase and a respective amplitude of the reflected wave component and the forward wave component.

3. The radar system of claim 1, wherein the analysis circuit is further configured to determine an impedance at the output node of the first radar chip based on the determined information.

4. The radar system of claim 3, wherein the analysis circuit is further configured to compare a difference between the impedance at the output node of the first radar chip for a first one of the at least two different combinations of the first and second loads and the impedance at the output node of the first radar chip for a second one of the at least two different combinations of the first and second loads to a threshold value.

5. The radar system of claim 4, wherein the analysis circuit is further configured to determine the distributions of the oscillation signal to the first and second input node via the first and second signal lines being not equal if the difference is greater than the threshold value.

6. The radar system of claim 1, wherein the oscillation signal is modulated.

7. The radar system of claim 1, wherein the first signal line and the second signal line share a common signal line section, or wherein the first signal line and the second signal line are completely separated.

8. The radar system of claim 1, wherein each of the plurality of first loads and the plurality of second loads exhibit an impedance different from a predefined value.

9. The radar system of claim 8, wherein the predefined value is 50Ω.

10. The radar system of claim 1, wherein the analysis circuit comprises a directional coupler coupled to the output node of the first radar chip and configured to output a first signal indicative of the reflected wave component, and a second signal indicative of the forward wave component.

11. The radar system of claim 10, wherein the analysis circuit further comprises a feedback receiver configured to down-convert the first signal and the second signal based on the oscillation signal in order to obtain a first down-converted signal and a second down-converted signal.

12. The radar system of claim 11, wherein the analysis circuit further comprises a processing circuit configured to determine an impedance at the output node of the first radar chip based on the first down-converted signal and the second down-converted signal.

13. The radar system of claim 1, wherein the first coupling circuit is further capable of controllably coupling at least one of a transmit path and a receive path of the second radar chip to the first input node.

14. The radar system of claim 1, wherein the information is first information; and the radar system further comprising:

a fourth radar chip comprising a third input node coupled to the output node of the first radar chip via a third signal line, wherein the fourth radar chip comprises a third coupling circuit capable of controllably coupling a selected one of a plurality of third loads to the third input node, wherein the control circuit is further configured to control the first to third coupling circuits to sequentially couple at least three different combinations of the first to third loads to the first to third input nodes, wherein the analysis circuit is further configured to determine second information indicating the reflected wave component and the forward wave component for each of the at least three different combinations of the first to third loads, and wherein the analysis circuit is further configured to determine, based on the determined second information, the distributions of the oscillation signal to the second to fourth radar chips via the first to third signal lines are equal.

15. A radar system, comprising:

a first radar chip comprising an output node configured to output an oscillation signal, a first input node coupled to the output node via a first signal line, and a first coupling circuit capable of controllably coupling a selected one of a plurality of first loads to the first input node;

a second radar chip comprising a second input node coupled to the output node of the first radar chip via a second signal line, and a second coupling circuit capable of controllably coupling a selected one of a plurality of second loads to the second input node; and a control circuit configured to control the first coupling circuit and the second coupling circuit to sequentially couple at least two different combinations of the first and second loads to the first and second input nodes, wherein the first radar chip comprises an analysis circuit configured to determine information indicating a reflected wave component and a forward wave component at the output node of the first radar chip for each of the at least two different combinations of the first and second loads, and wherein the analysis circuit is further configured to determine, based on the determined information, whether distributions of the oscillation signal to the first and second input nodes via the first and second signal lines are equal.

16. The radar system of claim 15, wherein the analysis circuit is further configured to determine an impedance at the output node of the first radar chip based on the determined information.

17. The radar system of claim 16, wherein the analysis circuit is further configured to:

compare a difference between the impedance at the output node of the first radar chip for a first one of the at least two different combinations of the first and second loads and the impedance at the output node of the first radar chip for a second one of the at least two different combinations of the first and second loads to a threshold value; and determine the distributions of the oscillation signal to the first and second input nodes via the first and second signal lines being not equal if the difference is greater than the threshold value.

18. The radar system of claim 15, wherein each of the plurality of first loads and the plurality of second loads exhibits an impedance different from a predefined value.

19. A method, comprising:

outputting an oscillation signal at an output node;

coupling at least two different combinations of first and second loads to first and second input nodes;

determining information indicating a reflected wave component and a forward wave component at the output node for each of the at least two different combinations of the first and second loads; and determining, based on the determined information, whether distributions of the oscillation signal to the first and second input nodes via first and second signal lines are equal.

20. The method of claim 19, wherein:

a first radar chip comprises the output node, a second radar chip comprises the first input node and a third radar chip comprises the second input node; or the first radar chip comprises the output node and the first input node, and the second radar chip comprises the second input node.

* * * * *

UNITED STATES PATENT AND TRADEMARK OFFICE
CERTIFICATE OF CORRECTION

PATENT NO. : 11,353,547 B2
APPLICATION NO. : 16/863326
DATED : June 7, 2022
INVENTOR(S) : Grigory Itkin It is certified that error appears in the above-identified patent and that said Letters Patent is hereby corrected as shown below:

In the Claims

Column 14 Line 26, change "based on the determined second information, the dis-" to -- based on the determined second information, whether the dis- --

Signed and Sealed this
Fifth Day of July, 2022

Katherine Kelly Vidal
*Director of the United States Patent and Trademark Office*